UNITED STATES PATENT OFFICE.

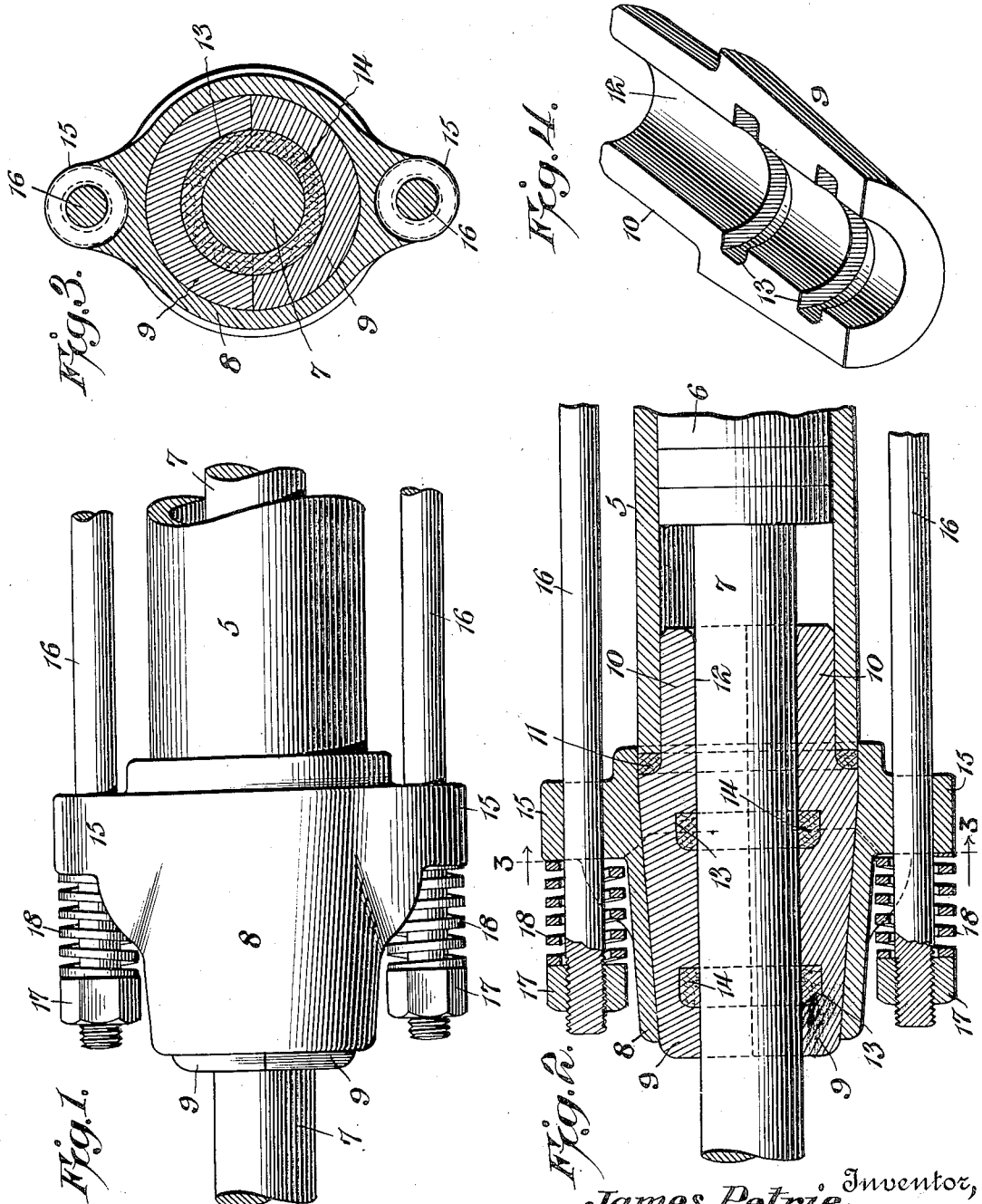

JAMES PETRIE, OF ROSSLAND, BRITISH COLUMBIA, CANADA.

DRILLING-MACHINE.

No. 917,484.   Specification of Letters Patent.   Patented April 6, 1909.

Application filed April 14, 1908. Serial No. 427,027.

*To all whom it may concern:*

Be it known that I, JAMES PETRIE, a subject of the King of Great Britain, residing at Rossland, British Columbia, Dominion of Canada, have invented a new and useful Drilling-Machine, of which the following is a specification.

This invention relates more particularly to the front heads of drilling-machines employed for mining or other analogous purposes, and the primary object is to provide a structure that is much more simple than that now in general use, is more effective, provides better facilities for packing, and is less expensive in the cost of maintenance.

The preferred form of construction is illustrated in the accompanying drawings, wherein:—

Figure 1 is a plan view of a portion of the drilling machine showing the novel head in place on the cylinder. Fig. 2 is a longitudinal sectional view through the same. Fig. 3 is a cross sectional view on the line 3—3 of Fig. 2. Fig. 4 is a detail perspective view of one of the bushing sections.

Similar reference numerals designate corresponding parts in all the figures of the drawings.

In the embodiment illustrated, a portion of a cylinder is shown, and is designated 5. Within this cylinder operates a reciprocatory piston 6 having a piston rod 7 that projects from one end of the cylinder. Associated with said end of the cylinder is a head comprising three pieces, an outer shell 8 and a bushing composed of two sections 9.

The bushing consists of an outer portion that tapers outwardly and continuously from its portion of greater diameter and an inner neck, the latter fitting within the end of the cylinder, and the inner end of the tapered portion or in other words the portion of greatest diameter being in line with and of the same diameter as the end of such cylinder. Packing 11 is preferably interposed between said ends. The bushing has a central longitudinal bore 12 formed partially in each section and in said bore the piston rod 7 operates. Said bushing is furthermore provided with two internal annular grooves 13 formed partially in each section and arranged to receive packing rings 14 of leather or other suitable material.

The shell 8 has an internal bore tapered to correspond to the taper of the outer portion of the bushing, said shell surrounding said bushing and holding the sections thereof together. The inner end portion of the shell covers the packing 11 and slightly overlaps the end of the cylinder. It is furthermore provided with a pair of opposite outstanding ears 15, through which are passed the usual holding rods 16, said rods having nuts 17 on their ends with springs 18 interposed between the nuts and the ears.

It will be noted that these springs 18 not only serve to hold the head as a whole upon the cylinder, but insamuch as they act directly against the shell to draw said shell toward said cylinder, they also act through the medium of the shell to clamp the bushing sections around the piston rod.

In practice, the bushing is preferably made of cast iron cored out to receive the packing rings while the outer shell is made of steel that surrounds and protects the bushing.

It will be evident that the structure is very simple, and that it can be cheaply manufactured. Moreover it has proven entirely effective and is very advantageous, inasmuch as it provides means whereby a plurality of packing rings can be employed that will effectively prevent leakage around the piston rod.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In mechanism of the character described, the combination with a cylinder, of a reciprocatory piston operating therein and having a piston rod projecting from one end, a bushing surrounding the projecting portion of the rod and closing the end of the cylinder, said bushing comprising separate longitudinal sections having a plurality of annular packing-receiving grooves on its interior face, the exterior face of the bushing being continuous unbroken and uniformly tapered from its point of largest diameter to its outer end, said point of greatest diameter being located adjacent to the cylinder, a shell surrounding the bushing and having a continuously and uniformly tapered bore corresponding to the taper of the bushing and receiving the same, and resilient means entirely out of engagement with the bushing acting to continuously force the shell inwardly toward the cylinder to force the sections of the bushing together and to hold the bushing in place on the end of the cylinder.

2. In mechanism of the character described, the combination with a cylinder, of a reciprocatory piston operating therein and having a piston rod projecting from one end, a bushing surrounding the projecting portion of the piston rod and comprising separable longitudinal sections having a plurality of annular packing-receiving grooves, said bushing having its inner end extending into the cylinder and having its portion of greatest diameter substantially equal to that of the cylinder and located adjacent to the end of said cylinder, the outer face of the bushing tapering continuously, uniformly and unbrokenly from said portion to its outer end, a shell surrounding the bushing and having a continuously and uniformly tapered bore that receives the tapered portion of the bushing, the portion of the bore of greatest diameter receiving the end of the cylinder and the largest portion of the bushing and permitting the shell to slide beyond the largest portion of the bushing and over said cylinder, and means for drawing the shell inwardly toward the cylinder to clamp the ends of the sections together.

3. In mechanism of the character described, the combination with a cylinder, of a reciprocatory piston operating therein and having a piston rod projecting from one end, a bushing surrounding the projecting portion of the piston rod and comprising separable longitudinal sections having a plurality of annular packing-receiving grooves, said bushing having its portion of greatest diameter located adjacent to the cylinder and its exterior surface tapering unbrokenly continuously and uniformly from said portion to its outer end, a shell surrounding the bushing and having a continuously and uniformly tapered bore corresponding to the taper of the bushing and receiving the same, holding rods passing through the shell entirely exterior to the bushing and not in engagement with the same, and springs mounted on said holding rods and bearing against the shell to continuously urge the same toward the cylinder and thereby force the bushing sections together about the piston rod.

4. In mechanism of the character described, the combination with a cylinder, of a reciprocatory piston operating therein and having a piston rod projecting from one end, a bushing surrounding the projecting portion of the piston rod and comprising separable longitudinal sections having a plurality of annular packing-receiving grooves, said bushing having its portion of greatest diameter located adjacent to the cylinder and having a neck smaller than the greatest diameter of the bushing by the thickness of said cylinder adapted to project into the cylinder and surround the piston rod, said bushing having its outer face tapered unbrokenly, continuously and uniformly from its greatest diameter to its outer end, a shell surrounding the bushing and having a continuously and uniformly tapered bore corresponding to the taper of the bushing and receiving the same, said shell being of such interior diameter as will permit it to be drawn back on the bushing past the point of greatest diameter thereof, packing between the end of the cylinder and the bushing and surrounding the neck of the latter, and resilient means for drawing the shell toward the cylinder and thereby force the bushing sections together about the piston rod and hold them in place within the cylinder.

In testimony, that I claim the foregoing as my own, I have hereto affixed my signature in the presence of two witnesses.

JAMES PETRIE.

Witnesses:
CHARLES ADAM,
ROBIN C. SHEEDY.